(12) United States Patent
Bergquist et al.

(10) Patent No.: US 8,880,960 B1
(45) Date of Patent: Nov. 4, 2014

(54) BUSINESS CONTINUITY PLANNING TOOL

(75) Inventors: Aaron M. Bergquist, Maple Plain, MN (US); Leonard Earl Sharpe, St. Michael, MN (US); Erica Fay Prairie, Minneapolis, MN (US); Jennifer Mary Warren Cassidy, Rogers, MN (US)

(73) Assignee: Target Brands, Inc., Minneapolis, MN (US)

( * ) Notice: Subject to any disclaimer, the term of this patent is extended or adjusted under 35 U.S.C. 154(b) by 260 days.

(21) Appl. No.: 13/467,807

(22) Filed: May 9, 2012

(51) Int. Cl.
*G06F 11/00* (2006.01)

(52) U.S. Cl.
USPC .................................................... 714/46

(58) Field of Classification Search
CPC . G06F 11/2294; G06F 11/22; G06F 11/0748; G03G 15/55
USPC ........................................................ 714/46
See application file for complete search history.

(56) References Cited

U.S. PATENT DOCUMENTS

| | | | |
|---|---|---|---|
| 6,708,330 B1 * | 3/2004 | Moberg et al. | 717/158 |
| 7,246,220 B1 * | 7/2007 | Cheng et al. | 712/228 |
| 2005/0165633 A1 | 7/2005 | Huber | |
| 2005/0210152 A1 * | 9/2005 | Hawes | 709/248 |
| 2006/0143161 A1 | 6/2006 | Munro | |
| 2008/0133300 A1 | 6/2008 | Jalinous | |
| 2008/0208605 A1 | 8/2008 | Sinha et al. | |
| 2009/0172769 A1 * | 7/2009 | Bobak et al. | 726/1 |
| 2009/0204583 A1 * | 8/2009 | Hechler et al. | 707/3 |

FOREIGN PATENT DOCUMENTS

| | | |
|---|---|---|
| WO | 01/26007 | 4/2001 |
| WO | 2004/008292 | 1/2004 |

* cited by examiner

*Primary Examiner* — Yair Leibovich
(74) *Attorney, Agent, or Firm* — Nixon & Vanderhye P.C.

(57) ABSTRACT

A request is received for a page to add a computer program name for a critical function that a business unit performs. A list of computer program names is retrieved from memory and is provided through a user interface. A selection of a first computer program name as being a name of a first computer program required to perform the critical function is received. A first expected recovery time is retrieved from memory for the first computer program and is provided through a user interface with a request for an indication of whether the first expected recovery time is acceptable.

15 Claims, 22 Drawing Sheets

FIG. 9

Business Continuity Planning — 404

Access Provisioning Services — 408

Status: Complete   [Submit for Approval]   [Print] — 410
406

| Plan Details | Critical Functions | Critical Records | Requirements | Telecom | Critical Contacts | Interdependecies | Team Members | Addendums |

414   416   418   420   422   424   426   428   430

Critical Functions

Directions:

Critical functions include all operations which must be performed within 48 hours in order to deliver the products and services that enable our company to meet its strategic priorities and core mission.

To complete this section, you must do the following:
 Create your new critical functions.
 Apply any new critical functions to your plan
 Add/remove applications.
 Edit/View any existing critical functions to ensure all the data is up-to-date.

[Create]   [Apply]   [Delete]

Applied Critical Functions

| Function Name | Recovery Time Objective | Impact |
| Grant Access to Platforms and Applications | 72 Hours | All Employees |

Application [▼] 1004   [Add] — 1006   [Edit/View]
          1002

Business Continuity Planning 404

Access Provisioning Services 408
Status: Complete       Submit for Approval    Print  — 410
         406

| Plan Details | Critical Functions | Critical Records | Requirements | Telecom | Critical Contacts | Interdependecies | Team Members | Addendums |

414   416    418        420          422      424         426              428          430

Critical Functions
Directions:
Critical functions include all operations which must be performed within 48 hours in order to deliver the products and services that enable our company to meet its strategic priorities and core mission.

To complete this section, you must do the following:
  Create your new critical functions.
  Apply any new critical functions to your plan
  Add/remove applications.
  Edit/View any existing critical functions to ensure all the data is up-to-date.

Create    Apply    Delete

Applied Critical Functions

Function Name              Recovery Time Objective    Impact
Grant Access to Platforms      72 Hours                        All Employees
and Applications
Add Applications           Remove Applications
Application Name           Recovery Time               Recovery time
Active Directory for           Immediate — 1104                meets Objective?    Edit/View
Corp domain — 1102                                             1106
                                                                    Yes ▼  — 1108       Add — 1110

Business Continuity Planning 404

Access Provisioning Services 408

Status: Complete 406  [Submit for Approval] [Print] — 410

| Plan Details | Critical Functions | Critical Records | Requirements | Telecom | Critical Contacts | Interdependecies | Team Members | Addendums |
|---|---|---|---|---|---|---|---|---|
| 414 | 416 | 418 | 420 | 422 | 424 | 426 | 428 | 430 |

Critical Functions

Directions:
Critical functions include all operations which must be performed within 48 hours in order to deliver the products and services that enable our company to meet its strategic priorities and core mission.

To complete this section, you must do the following:
- Create your new critical functions.
- Apply any new critical functions to your plan
- Add/remove applications.
- Edit/View any existing critical functions to ensure all the data is up-to-date.

[Create] [Apply] [Delete]

Applied Critical Functions

| Function Name | Recovery Time Objective | Impact |
|---|---|---|
| Grant Access to Platforms and Applications | 72 Hours —1202 | All Employees |

[Add Applications] [Remove Applications] —1206
                    1204              1210

| Application Name | Recovery Time | Recovery Point Objective | |
|---|---|---|---|
| Active Directory for Corp domain | Immediate | Yes | [Edit/View] |
| Active Directory for HQ domain | Immediate | Yes | |
| ACF2 —1208 | 7 days | Yes | |

1200   FIG. 12

Business Continuity Planning — 404

Access Provisioning Services — 408

Status: Complete — 406  Submit for Approval | Print — 410

| Plan Details | Critical Functions | Critical Records | Requirements | Telecom | Critical Contacts | Interdependecies | Team Members | Addendums |
|---|---|---|---|---|---|---|---|---|
| 414 | 416 | 418 | 420 | 422 | 424 | 426 | 428 | 430 |

Minimum Requirements Inventory

Directions:
Use this section to document your current and preferred alternate location(s) and minimum team member requirements.

Add New Location  Delete Location — 1402

Current Location — 1434
● CC — 1406
○ Specify your own value: 1404
1408  1410

Preferred Alternate Location
● TNC — 1412
○ Specify your own value: 1414
1416

Assigned Alternate Location Room: n/a — 1418
Current Team Member Population: 6 — 1420
Minimum Team Members Required: 2 — 1422
Alternate Location Workstations: 2 — 1424
Team Members that Can Work From Home: 6 — 1426
Team Members with Company-Owned Laptops: 6 — 1428

Save — 1430  Cancel — 1432

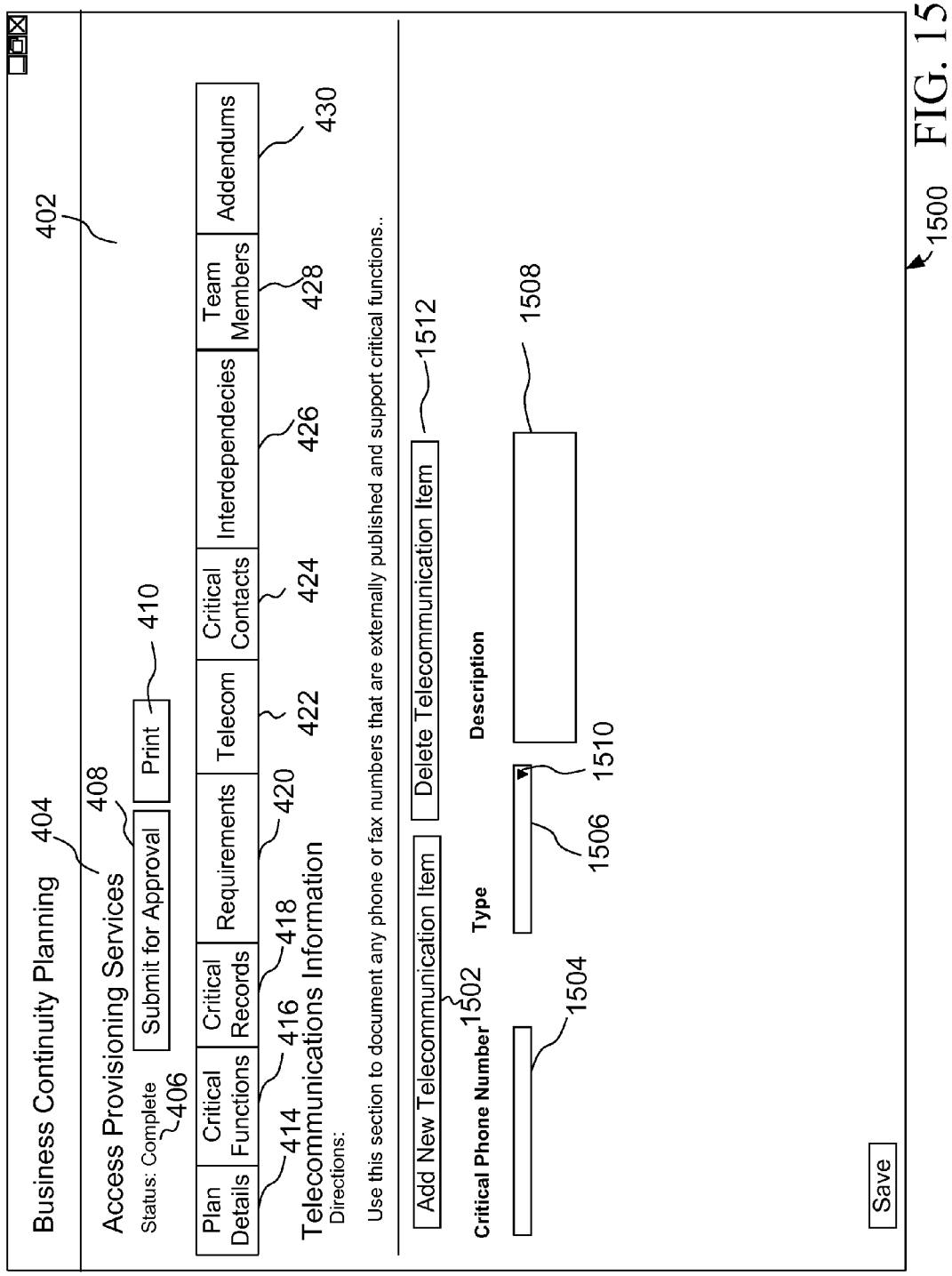

FIG. 16

Business Continuity Planning — 404

402

Access Provisioning Services — 408

Status: Complete
406

Submit for Approval    Print — 410

| Plan Details | Critical Functions | Critical Records | Requirements | Telecom | Critical Contacts | Interdependencies | Team Members | Addendums |
|---|---|---|---|---|---|---|---|---|
| 414 | 416 | 418 | 420 | 422 | 424 | 426 | 428 | 430 |

Critical Contacts

Directions:
Use this section to document contact information for business units or vendors that support your critical functions.

If you previously included this information as an attachment, please transfer the information into the fields below 1602 —  Add Critical Contacts    Delete Critical Contacts

Business Unit Vendor    Phone Number    Contact Person    Notes

Client Support Center    763-555-5555    Maria    Fulfillment Partner 1604    1606    1608    1610

Business Continuity Planning 404

Access Provisioning Services 408

Status: Complete 406    Submit for Approval | Print — 410

| Plan Details | Critical Functions | Critical Records | Requirements | Telecom | Critical Contacts | Interdependecies | Team Members | Addendums |
|---|---|---|---|---|---|---|---|---|
| | 414 | 416 | 418 | 422 | 424 | 426 | 428 | 430 |

420

Interdependencies

Directions:
Use this section to list all business units, both internal and external, that you depend on, and/or depend on you for support to perform your critical functions.

Include any major company initiatives that support critical functions.

If you previously included this information as an attachment, please transfer the informatino into the fields below Add Interdependencies 1702    Delete Interdependencies Business Unit or Vendor    Information Inflow/Outflow    Workflow Description 1704    1706 1710    1708

Save 1712

1700
402

Business Continuity Planning 404

Access Provisioning Services 408

Status: Complete 406    Submit for Approval   Print 410

| Plan Details | Critical Functions | Critical Records | Requirements | Telecom | Critical Contacts | Interdependecies | Team Members | Addendums |
|---|---|---|---|---|---|---|---|---|
| 414 | 416 | 418 | 420 | 422 | 424 | 426 | 428 | 430 |

Team Members

Directions:
Document all business unit team members' contact information

If you have an existing team member contact datasheet, please upload that by selecting the Upload button below
If you are developing a new plan, click here to use the provided template (To save template to your Business Continuity Plan, first do a Save As and save the document to a local drive. Then add the document by selecting Upload below.)
In order to update an existing document, you'll need to save it to a local drive and reupload it.

Upload ▼ — 1802

| Delete | Team Member Addendum | Modified By | Modified |
|---|---|---|---|
| | BC_TM_CONTACT_INFO.XLS | Tom.Smith | 5/26/2011 3:50 PM |
| | 1804 | 1806 | 1808 |

Business Continuity Planning ~404

Access Provisioning Services ~408

Status: Complete ~406  Submit for Approval   Print ~410

| Plan Details | Critical Functions | Critical Records | Requirements | Telecom | Critical Contacts | Interdependecies | Team Members | Addendums |
|---|---|---|---|---|---|---|---|---|
| 414 | 416 | 418 | 420 | 422 | 424 | 426 | 428 | 430 |

Addendums
Directions:
If your team does not have a site, upload any documents that support your critical functions here.
For more details, review the Critical Records section of the Business Continuity Wiki Portal
In order to update an existing document, you'll need to save it to a local drive and re-upload it
You MUST rename the file with a unique name-please include your team's name in the new file name.

Upload ▼ ~1902

| | Addendum Name | Modified By | Modified |
|---|---|---|---|
| Delete | Impact on Critical Groups.xsl | Tom.Smith | 5/26/2011 3:50 PM |
| Delete | Tcom GS contact information.xsl | Jill.Jones | 7/28/2011 12:49 PM |

Company Metrics

| | Total | Plan Approved | Simulation | Tabletop | Notification | Annual Training |
|---|---|---|---|---|---|---|
| | 228 | 94%(215) | 0% | 57%(130) | 82%(187) | 47%(108) |

Pyramid Metrics

| Pyramid | Total | Plan Approved | Simulation | Tabletop | Notification | Annual Training |
|---|---|---|---|---|---|---|
| Distrib. | 15 | 100% | 7%(15) | 87%(13) | 100% | 87%(13) |
| Finance | 20 | 100% | 0% | 80%(16) | 100% | 55%(11) |
| Retail Serv | 36 | 100% | 0% | 72%(26) | 100% | 39%(14) |
| Human Rs | 8 | 100% | 0% | 88%(7) | 100% | 63%(5) |
| Law | 5 | 100% | 0% | 60%(3) | 100% | 40%(2) |
| Market. | 10 | 100% | 0% | 80%(8) | 100% | 40%(4) |
| Merch. | 16 | 100% | 0% | 50%(8) | 100% | 56%(9) |
| Int'l | 23 | 70%(16) | 0% | 0% | 0% | 22%(5) |
| Property | 10 | 100% | 0% | 40%(4) | 100% | 50%(5) |
| Stores | 10 | 100% | 0% | 50%(5) | 100% | 90%(9) |
| India | 18 | 67%(12) | 0% | 0% | 0% | 22%(4) |
| Tech | 57 | 100% | 0% | 70%(40) | 100% | 47%(27) |

Business Unit Metrics

| Business Unit | Plan Approved | Simulation | Tabletop | Notification | Annual Training |
|---|---|---|---|---|---|
| +Distrib. | | | | | |
| +Finance | | | | | |
| +Retail Services | | | | | |
| +Human Resources | | | | | |
| +Law | | | | | |
| +Market. | | | | | |
| +Merch. | | | | | |
| +Int'l | | | | | |
| +Property | | | | | |
| +Stores | | | | | |
| +India | | | | | |
| +Tech | | | | | |

FIG. 21

BUSINESS CONTINUITY PLANNING TOOL

BACKGROUND

Business continuity planning is a process by which businesses establish plans for recovering from catastrophic events. Business continuity plans can provide ways to access backups of data and computer programs, list alternative locations where business can be conducted, and provide contact lists for employees, vendors and clients.

The discussion above is merely provided for general background information and is not intended to be used as an aid in determining the scope of the claimed subject matter. The claimed subject matter is not limited to implementations that solve any or all disadvantages noted in the background.

SUMMARY

A request is received for a page to add a computer program name for a critical function that a business unit performs. A list of computer program names is retrieved from memory and is provided through a user interface. A selection of a first computer program name as being a name of a first computer program required to perform the critical function is received. A first expected recovery time is retrieved from memory for the first computer program and is provided through a user interface with a request for an indication of whether the first expected recovery time is acceptable.

In accordance with a further embodiment, a list of computer application names is provided for computer applications available on a network. A selection of one of the computer application names is received. A recovery time for the selected computer application name is retrieved, where the recovery time represents an amount of time needed to make a computer application with the computer application name available to an end user after an event caused the computer application to be inaccessible. The retrieved recovery time is then displayed to a user through a user interface.

In accordance with a further embodiment, a server provides a business continuity planning tool comprising a plurality of pages. Each page includes entry controls for receiving information for a business continuity plan for a current business unit and links to all other pages in the plurality of pages. Each page further includes a button to submit the business continuity plan for approval.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 is an example of a critical functions page after a critical function has been applied.

FIG. 10 is an example of a critical functions after an add applications button has been selected.

FIG. 11 is an example of a critical functions page after an application has been added.

FIG. 12 is an example of a critical functions page after a user indicates whether a recovery time meets a recovery point objective.

FIG. 14 is an example of a user interface of a minimum requirements inventory page.

FIG. 15 is an example of a user interface of a telecommunications information page.

FIG. 16 is an example of a user interface for a critical contacts page.

FIG. 17 is an example of a user interface for an interdependencies page.

FIG. 18 is an example of a user interface for a team members page.

FIG. 19 is an example of a user interface for an addendums page.

FIG. 21 is an example of a user interface showing business continuity planning metrics.

DETAILED DESCRIPTION

A business continuity plan is a collection of information that can be used by a business unit to recover from a catastrophic event as quickly as possible so that the business unit can resume providing critical functions necessary to the operation of a business. In accordance with several embodiments, a business continuity planning system is provided that allows a business unit to construct a business continuity plan. The business continuity planning system includes a page to define critical functions performed by the business unit and to designate applications needed in order to perform the critical function. The applications as designated by selecting them from a pull-down menu. Upon selection, a recovery time associated with the selected application is displayed. This recovery time is set by a separate business unit responsible for making the computer application available. Once all the information required for the business continuity plan has been received, a submit-plan-for-approval button is displayed on each page of the business continuity plan. As a result, a user is able to submit the plan for approval from any page of the business continuity plan.

Figure 1:
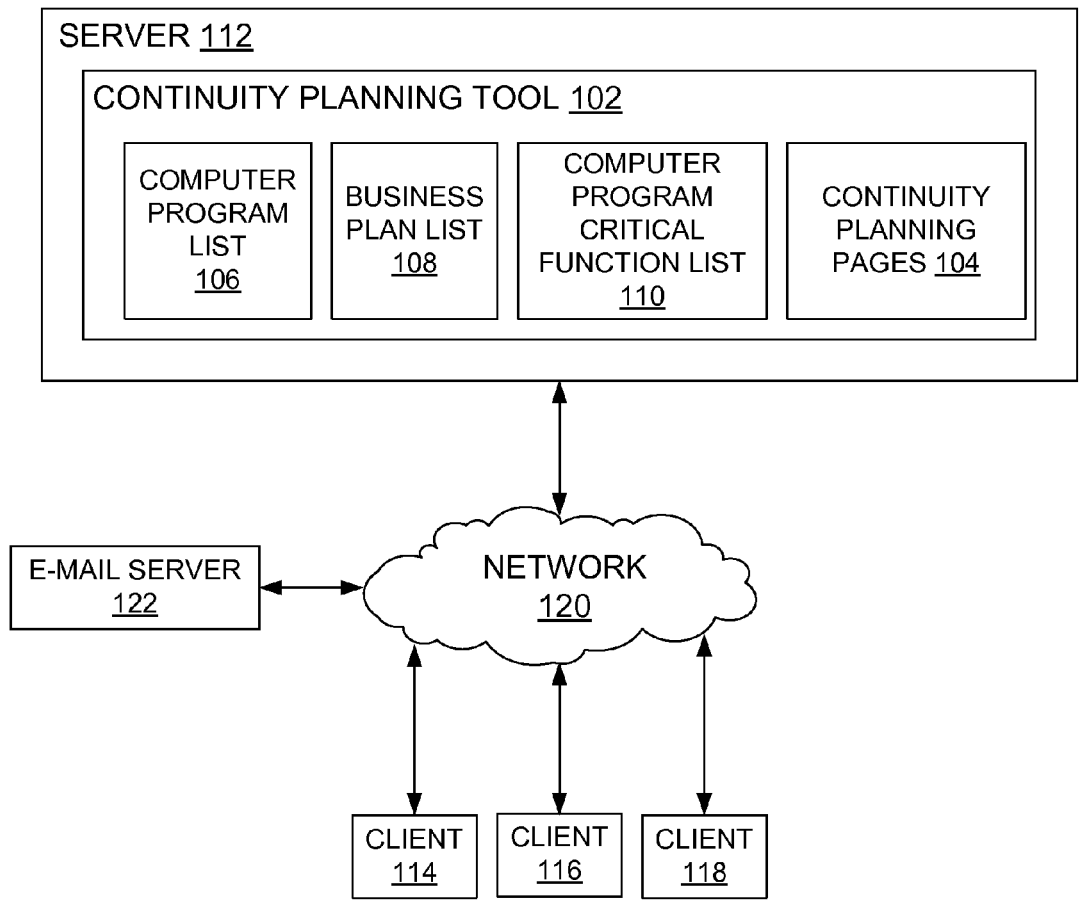
FIG. 1 is a block diagram of a business continuity planning system.

FIG. 1 provides a block diagram of a network environment 100 in which a business continuity planning system is implemented. The business continuity planning system includes a continuity planning tool 102 comprising a plurality of continuity planning pages 104, a computer program list 106, a business plan list 108 and a computer program critical function list 110. Continuity planning tool 102 is stored on a server 112 that serves continuity planning pages 104 in response to requests from one or more clients 114, 116, and 118. Clients 114, 116, and 118 communicate with server 112 through a network 120. Continuity planning pages 104 are used to collect information needed to form a business continuity plan.

Each of pages 104 includes both instructions for rendering the page as well as client-side code and server-side code that can be executed to implement functions on the pages 104. Some of the functions performed by pages 104 include sending a request to an email server 122 to send an email to one or more addresses based on selections made within pages 104 by users of clients 114, 116, and 118.

Figure 22:
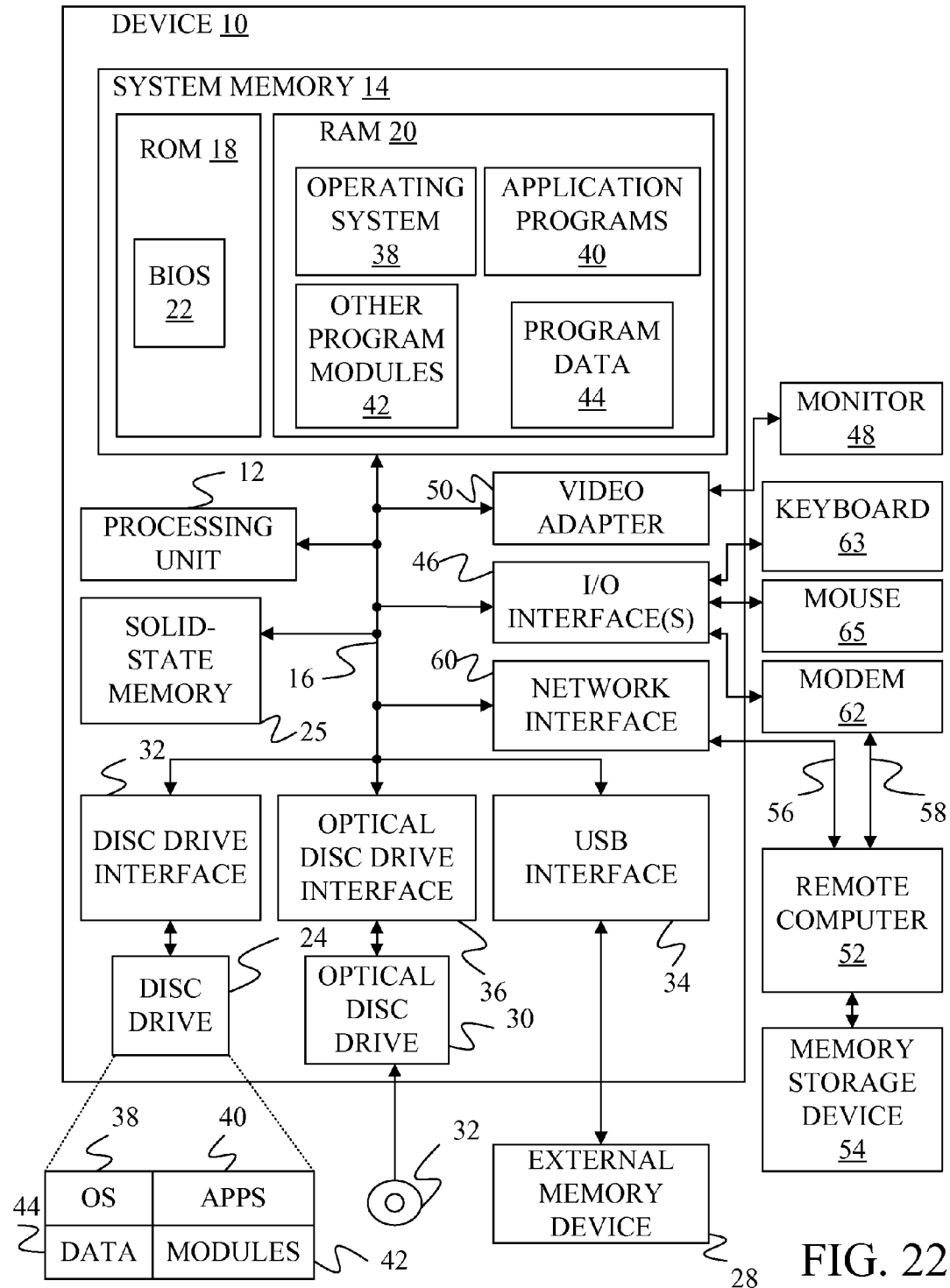
FIG. 22 is an example of a block diagram of a computer system that may be used as a client or server in embodiments of the disclosed methods.

Server 112, clients 114, 116, and 118, and email server 122 may each be implemented as a computing device as discussed in more detail in FIG. 22.

Figure 2:
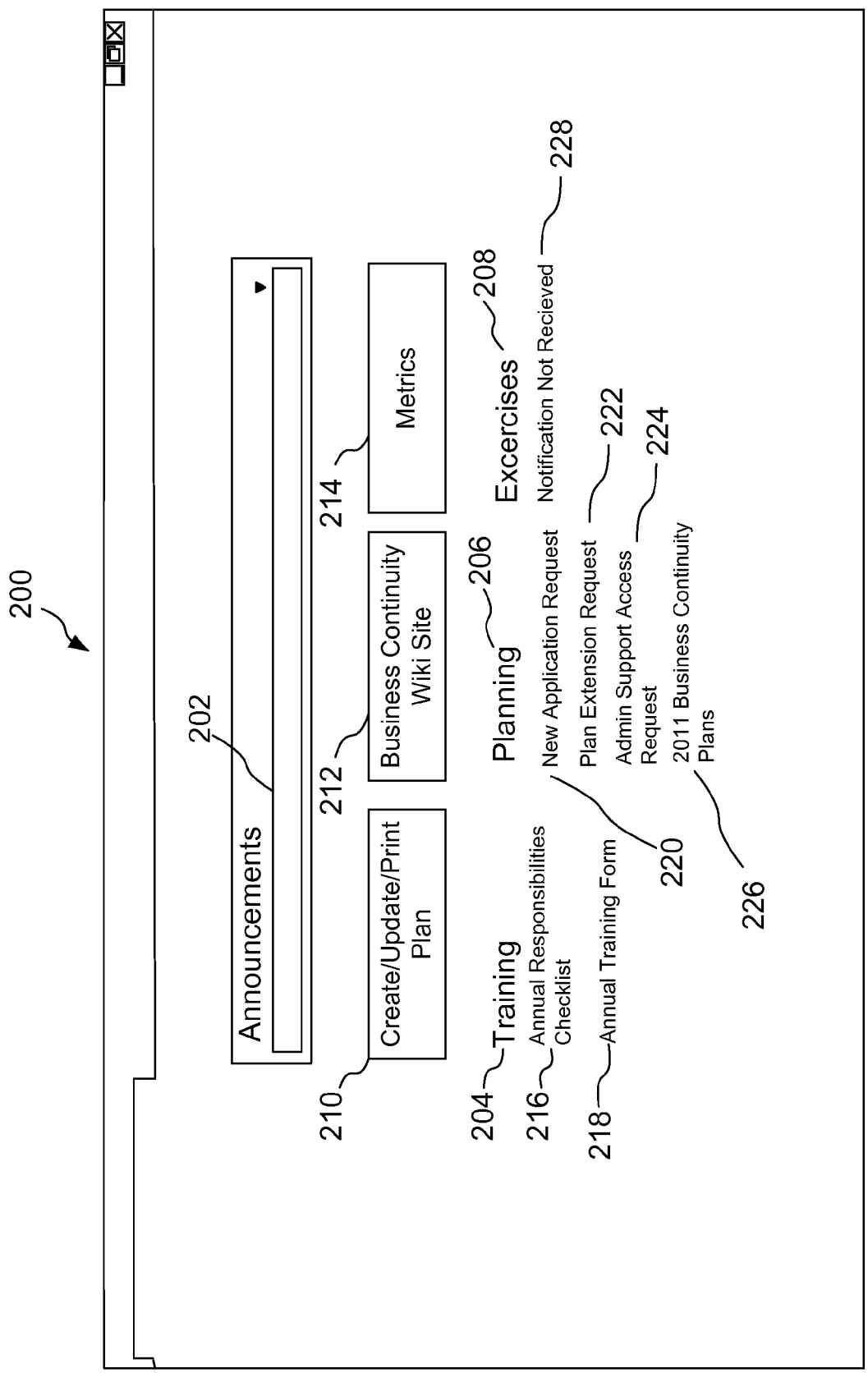
FIG. 2 is an example of a user interface for a business continuity planning homepage.

FIG. 2 provides an example of a homepage 200, which is one of continuity planning pages 104. Homepage 200 includes an announcements area 202, a training area 204, a planning area 206, an exercises area 208, create/update/print plan button 210, business continuity wiki site button 212, and metrics button 214.

Announcements area 202 provides business continuity planning announcements such as due dates for business continuity plans.

Training area 204 includes an annual responsibilities checklist link 216 and an annual training form link 218. Annual responsibilities checklist link 216 links to a page that describes what a business unit needs to do to construct a business continuity plan. Annual training form link 218 provides a form that must be completed in order to get credit for business continuity training.

Planning area 206 includes a new application request link 220 that allows a user to designate an application that is not present in pull-down menus discussed further below. Since users are only able to indicate that applications within the pull-down menus are necessary for critical functions, if a computer application is not present in the pull-down menus, the user must use link 220 to request that the application be added to the pull-down menu. In response to such a request, the application will be added to the pull-down menu by the technology center responsible for the application and the recovery time needed to restore the application to a network after a catastrophic event will also be set by the technology center responsible for the application.

Planning area 206 also includes a plan extension request link 222 that allows a business unit to request an extension of time in order to prepare the business continuity plan. Planning area 206 also includes an administrative support access request link 224 that allows a user to request permission to have their administrative assistant prepare the business continuity plan for them. Planning area 206 also includes a prior business continuity plan link 226 that provides a previous year's business continuity plan for this business unit.

Exercises area 208 includes links used during simulation exercises. In particular, link 228 allows users to indicate that they did not receive a notification they should have received during a simulation exercise.

Business continuity Wiki site button 212 opens a browser window that displays a business continuity Wiki site. The business continuity Wiki site provides information about business continuity planning and the business continuity planning tool.

Metrics button 214 provides information about business continuity planning metrics. In accordance with some embodiments, metrics button 214 is only made available on page 200 for users who are part of the business continuity planning team. As shown in more detail below for FIG. 21, business continuity planning metrics provide statistics on the number of business units that have completed various phases of the business continuity planning process.

Figure 3:
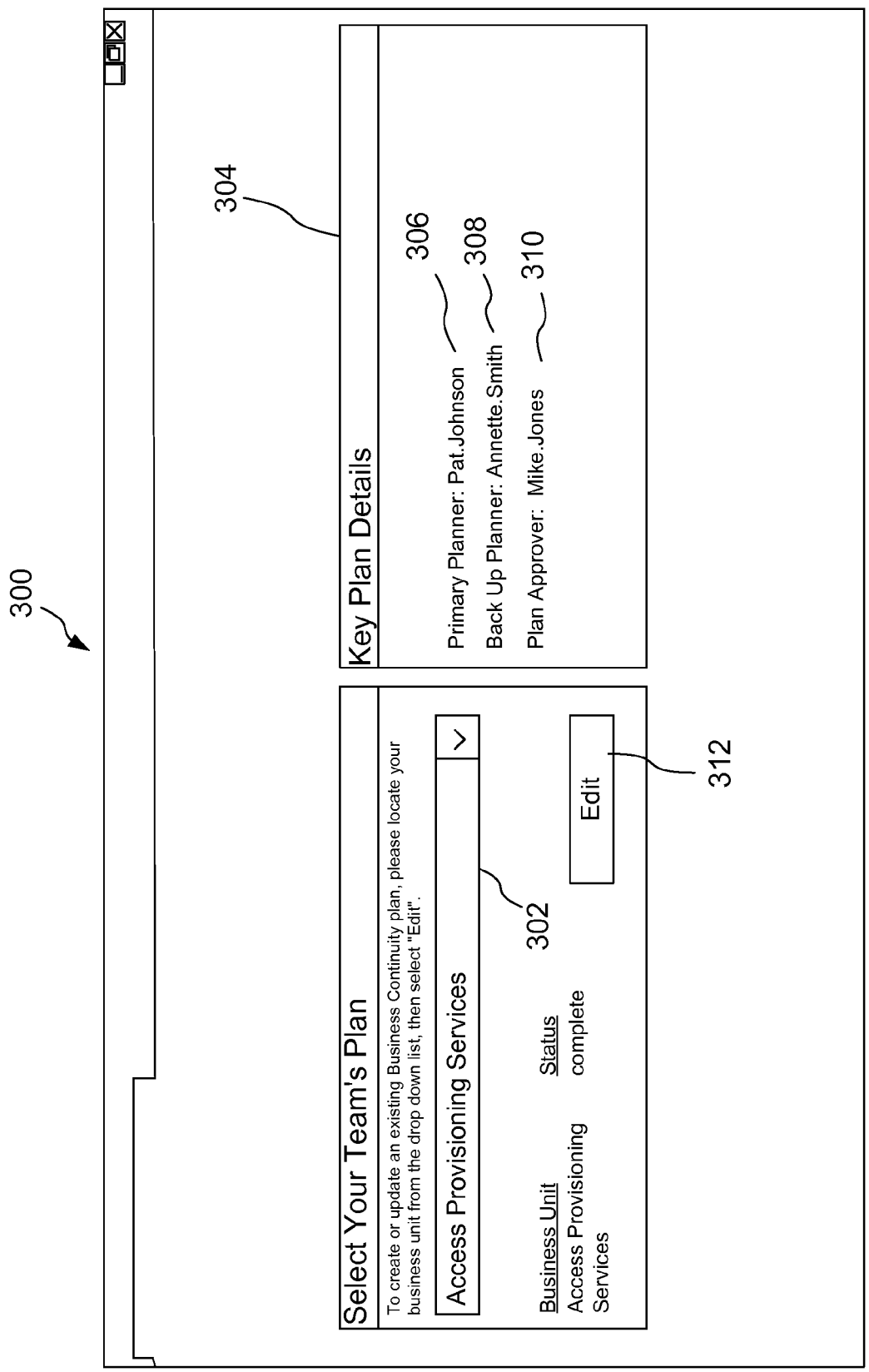
FIG. 3 is an example of a user interface of a team selection page.
Figure 4:
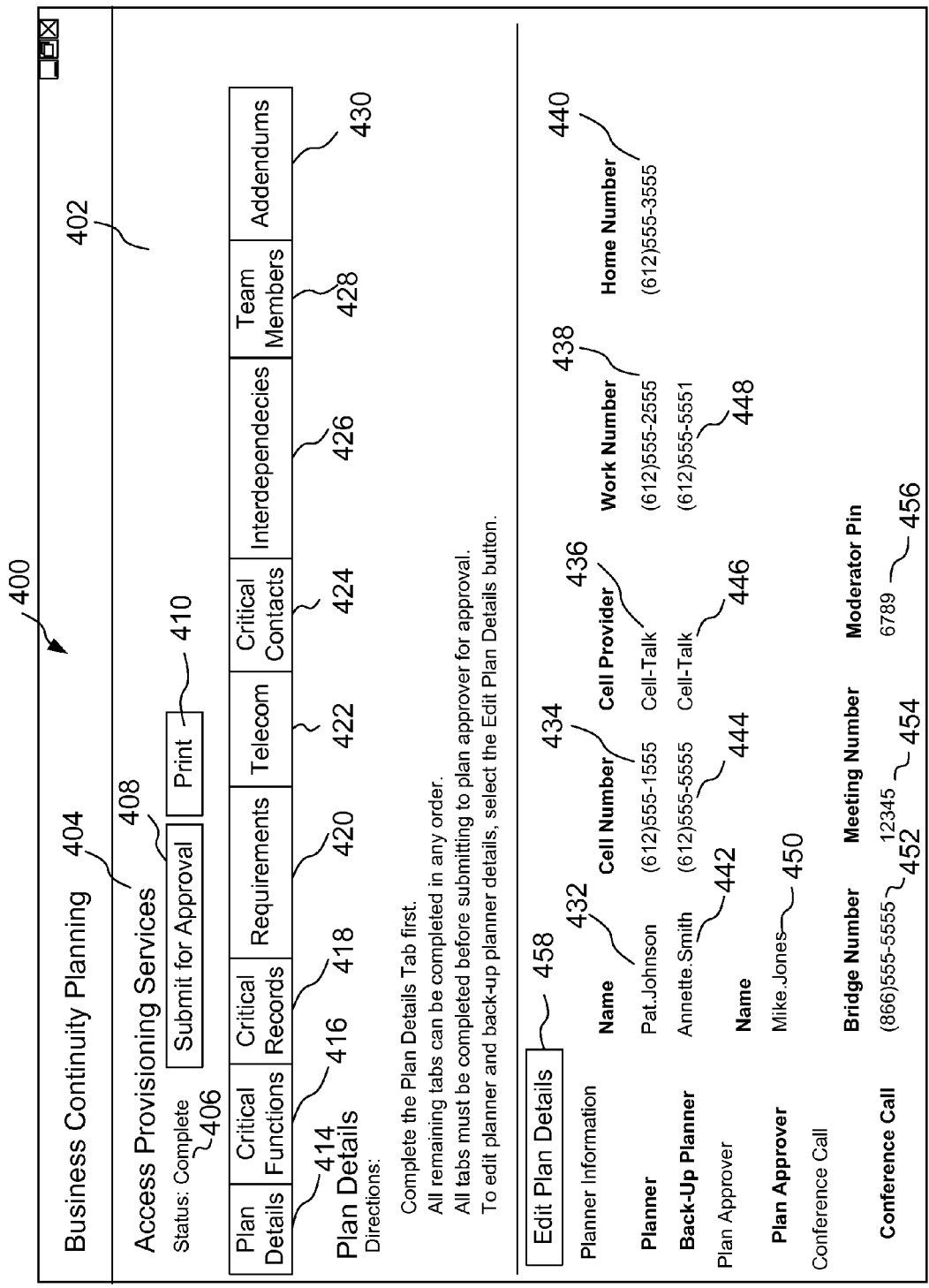
FIG. 4 is an example of a user interface of a plan details page.

Create/update/print plan button 210 requests a plan selection page 300 of FIG. 3 when selected. Plan selection page 300 includes a business unit input field 302 with a pull-down menu that is used to designate which business unit the business continuity plan is being constructed for. Page 300 also includes a key plan details area 304 that identifies personnel involved in business continuity planning for the selected business unit. The personnel listed in details area 304 include the primary planner 306, backup planner 308, and plan approver 310. This information is provided on page 300 as feedback to the user that they have selected the correct business unit. Business unit selection page 300 also includes an edit button 312 that when selected brings up an initial page 400 of a business continuity plan for the selected business unit as shown in FIG. 4.

Initial page 400 includes a header 402 having a business unit title 404, status 406, a submit-for-approval button 408, and a print button 410. Header 400 also includes a tabbed menu 412 that includes links to all other pages of continuity planning pages 104 including links 414, 416, 418, 420, 422, 424, 426, 428, and 430.

In accordance with some embodiments, submit-for-approval button 408 is only displayed if information needed on each of the business continuity planning pages has already been provided. If information on one or more of the pages has yet to be provided, the submit-for-approval button 408 will not be displayed in header 402.

Header 402 is displayed on every page of continuity planning pages 104. Thus, once the required information has been provided in the business continuity planning tool, submit-for-approval button 408 will appear in header 402 regardless of what page is displayed. As a result, users are able to submit a business continuity plan for approval without having to go to a particular page in the business continuity planning tool. This allows the user to be more efficient and allows them to complete the business continuity plan in any order they wish such that as soon as they provide the last piece of needed information for the business continuity plan, they can submit the plan for approval directly by pressing button 408.

Initial page 400 is a plan details page. Plan details page 400 allows a user to designate information about the planner, backup planner, plan approver, and conference calls needed to complete the business continuity plan. The planner information includes the name 432, cell phone number 434, cell provider 436, work phone number 438, and home number 440 of the planner. It also includes the name 442, cell phone number 444, cell provider 446, and work phone number 448 of the backup planner. Page 400 also indicates the name 450 of the plan approver.

Conference call information includes a bridge phone number 452 for the conference call, a meeting number or code 454 for entering the conference call, and a moderator pin number 456 used by the moderator of the conference call to sign in to the conference call. To edit the information on page 400, the user selects edit plan details button 458, which opens a new page with editable fields for each of the pieces of information described above.

Figure 5:
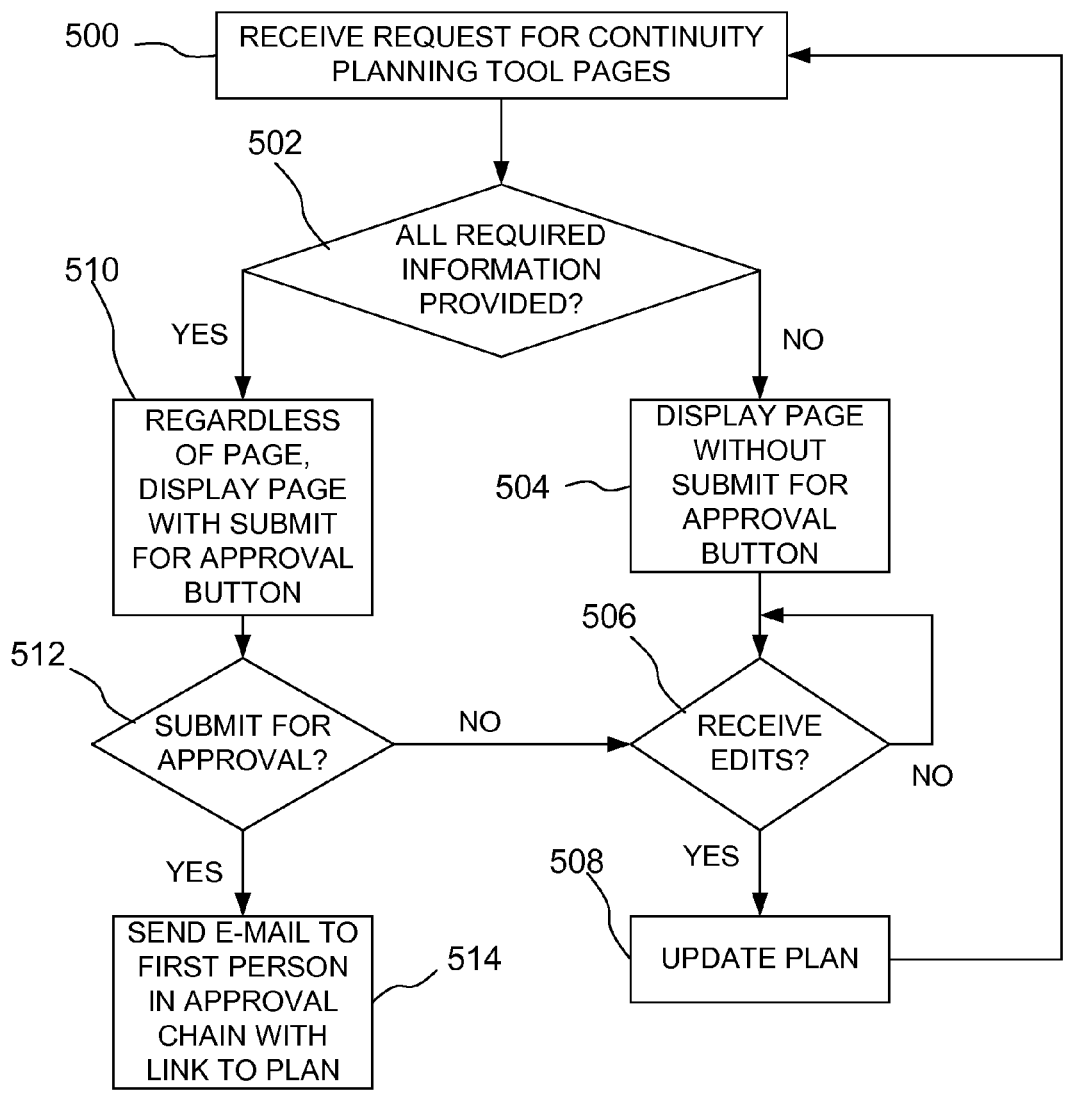
FIG. 5 is a flow diagram of a method of displaying a page of a business continuity plan.

FIG. 5 provides a method for displaying a business continuity planning page. In step 500 of FIG. 5, a request for the business continuity planning tool page is received. This request can be in the form of the selection of edit button 312 of FIG. 3 or one of the links 414, 416, 418, 420, 422, 424, 426, 428, and 430 of header 402. This request may also take the form of a page refresh request performed as a result of a user submitting data on a page.

At step 502, the method determines if all the information required for the business continuity plan has been provided.

In accordance with one embodiment, each page in continuity planning pages 104 includes at least one entry control for entering information for the business continuity plan. Entry controls can include input box or input entry fields and upload buttons. Although every page provides such entry controls, in accordance with some embodiments, the information entered on a page may not be required for the business continuity plan.

If all the required information has not been provided, the page is displayed without the submit-for-approval button as step 504. The method then waits to receive edits on the page at step 506. If edits are received, the plan is updated at step 508 causing the current page to be refreshed by returning to step 500 with a request for the current page.

When all of the required information has been provided for the plan at step 502, the current page is displayed with the submit-for-approval button regardless of which page is being displayed at step 510. If the submit-for-approval button is not selected at step 512, but edits are received at step 506, the plan is updated again at step 508 and the process returns to step 500. If the submit-for-approval button is selected at step 512, an email is sent to a first person in an approval chain at step 514. This email will include a link to the business continuity plan.

Figure 6:
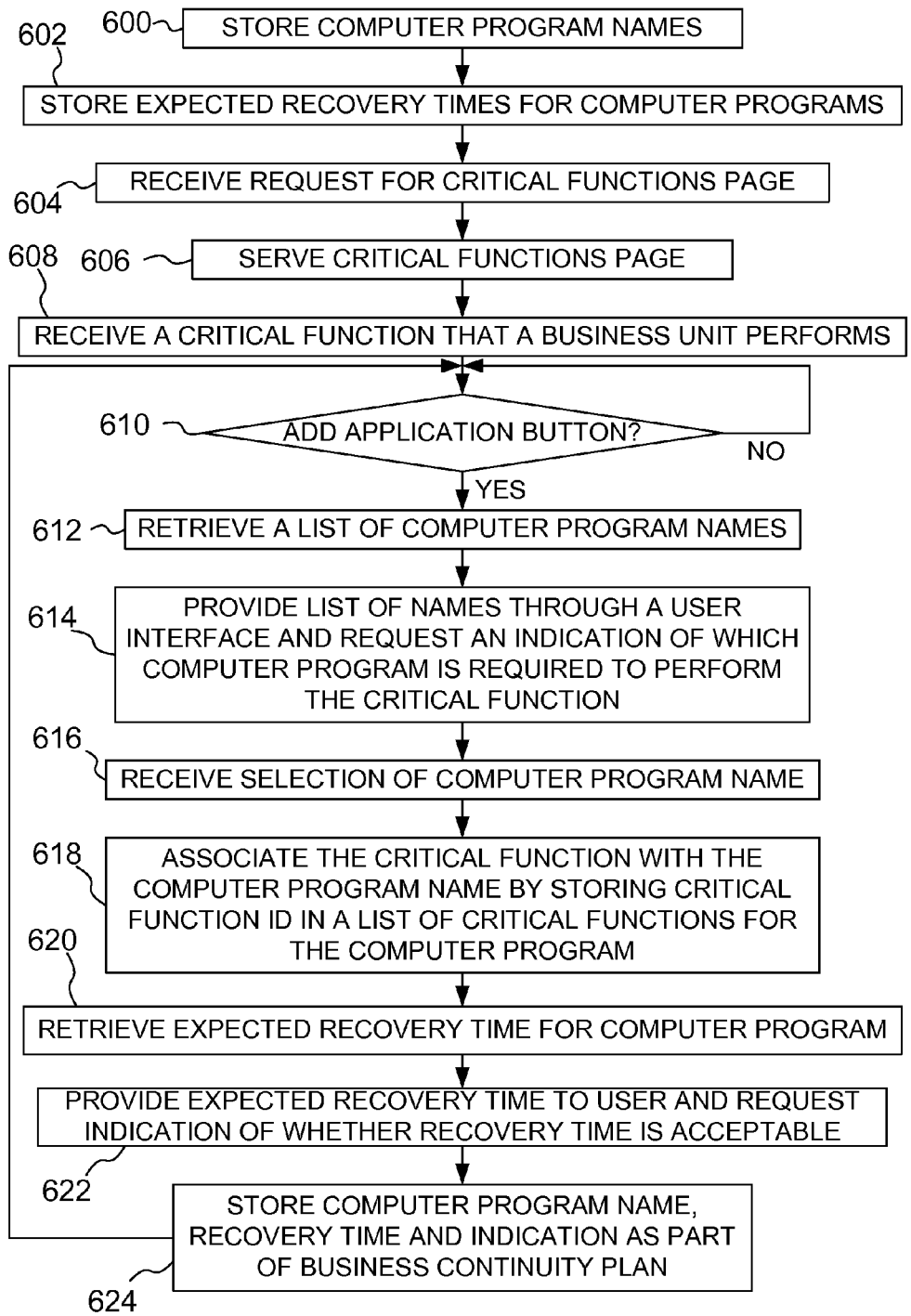
FIG. 6 is a flow diagram associated with a critical functions page.
Figure 7:
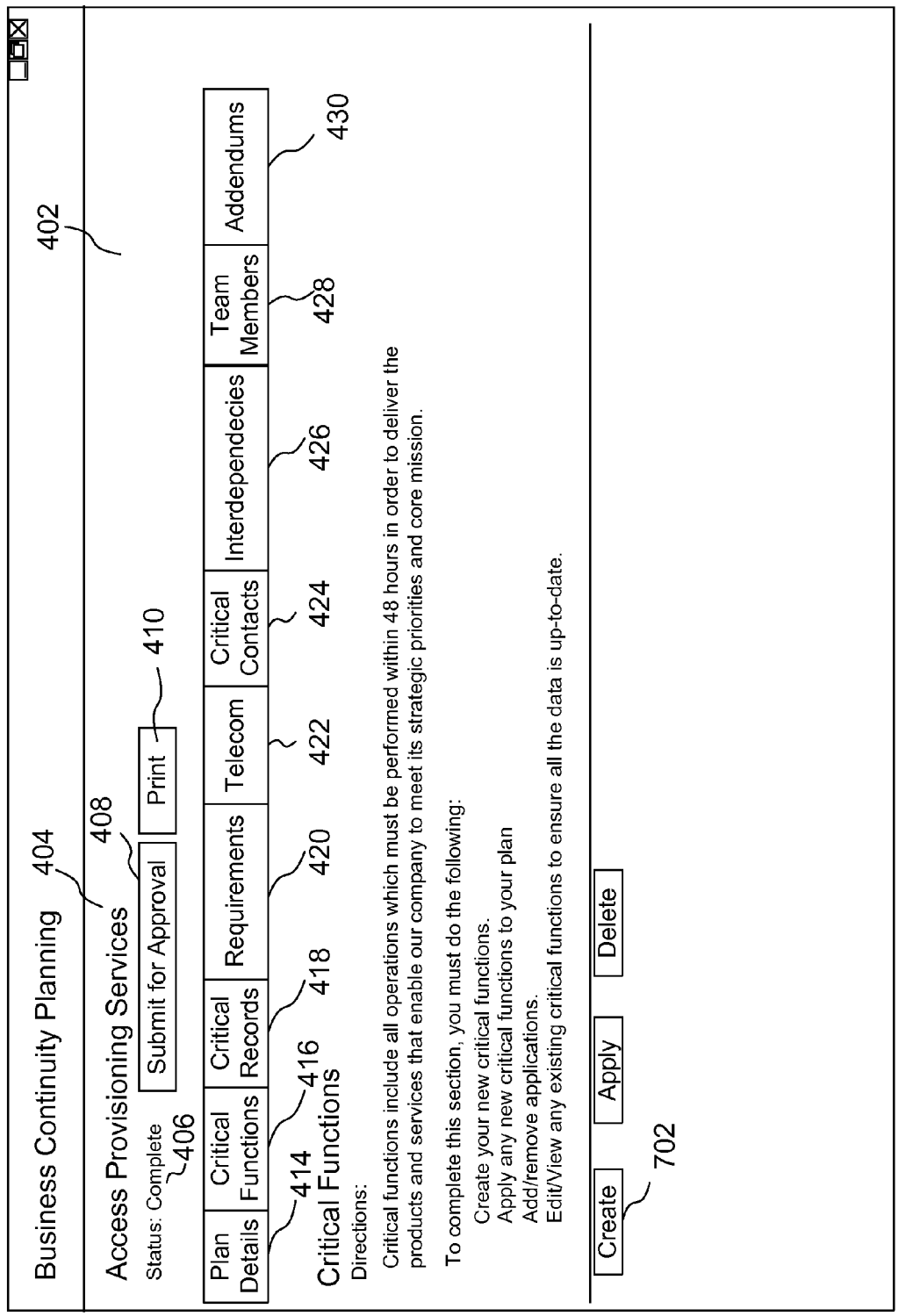
FIG. 7 is an example of a user interface of a critical functions page.

Selecting critical functions tab 416 in header 402 brings the user to a critical functions page such as critical functions page 700 of FIG. 7. FIG. 6 provides a flow diagram for a method of generating critical functions page 700 and the execution of critical functions page 700.

At step 600 computer program names for computer programs that are available on a network are stored within business continuity planning tool 102. In particular, the computer program names are stored in computer program list 106. The computer names are typically inserted by the administrators responsible for maintaining the computer programs and for recovering the computer programs if they become inaccessible. At step 602, the administrators store the expected recovery time for each computer program. These are typically stored as part of computer program list 106. The expected recovery time is the time that will be required to make the computer program available to a network if the computer that provides access to the computer program is destroyed, becomes non-functional, or becomes inaccessible. Note that steps 600 and 602 are performed before a critical function has been identified by the current business unit and are set by administrator who are outside of the business unit and are responsible for recovery of the computer programs.

Figure 8:
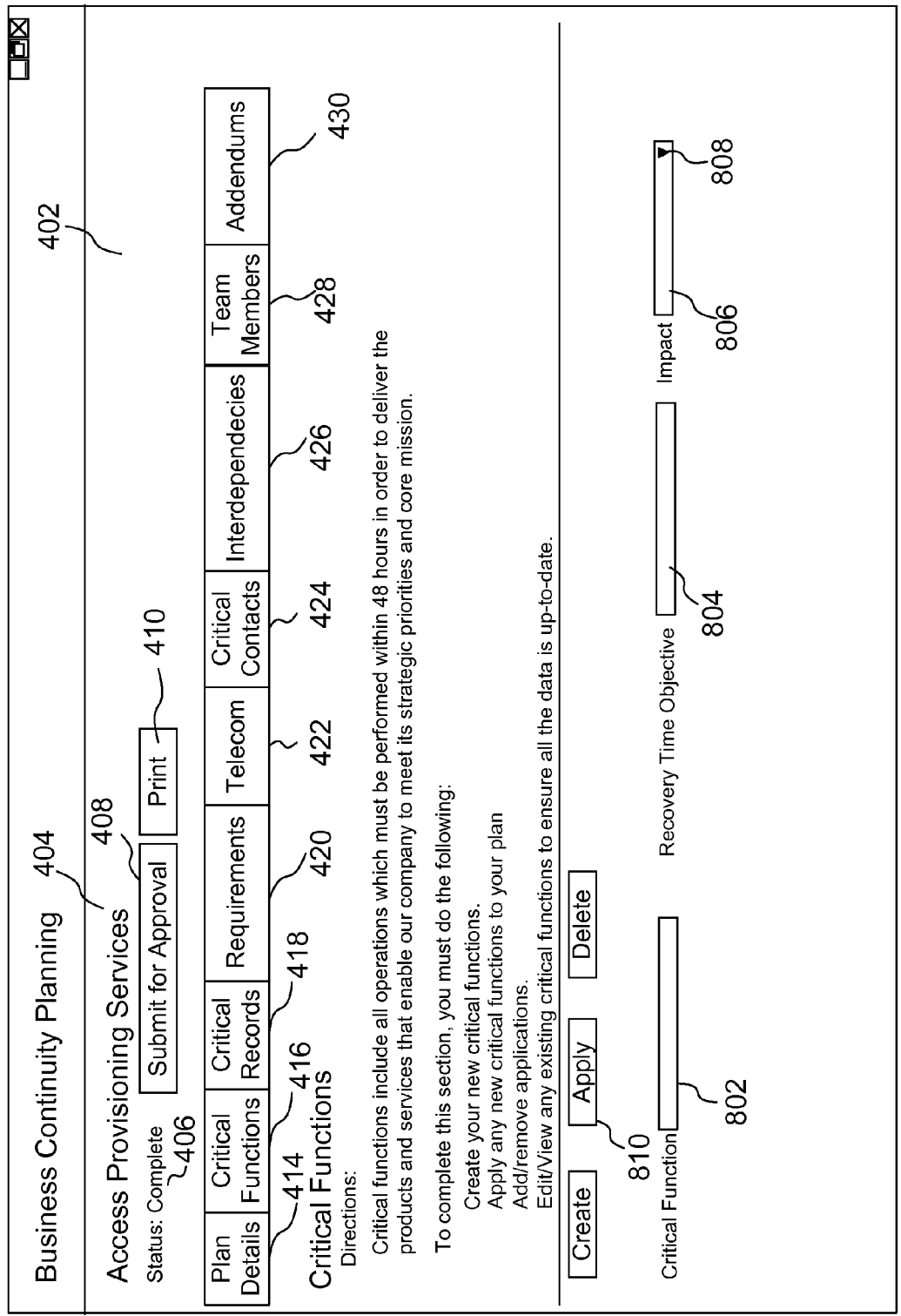
FIG. 8 is an example of a critical functions page after a critical function has been created.

At step 604, server 112 receives a request for critical functions page 700 from a client. At step 606, server 112 serves the critical functions page to the client and at step 608, business continuity planning tool 102 receives an indication of a critical function that a business unit performs. In accordance with one embodiment, a critical function is a function that a business unit must perform within 48 hours in order to deliver products and services that enable a company to meet its strategic priorities. A user enters a critical function that a business unit performs by selecting create button 702 of critical functions page 700. In response, critical functions page 700 is modified to become critical functions page 800 of FIG. 8. Critical functions page 800 includes a critical function input box 802 that allows a user to type in a critical function that their business unit performs. In accordance with some embodiments, the critical functions may be listed in a pull-down menu in input box 802. Once the user has inserted the critical function, they add a recovery time objective 804, which indicates their goal for having the critical function be operational after a catastrophic event. The user then indicates what parties are impacted by the loss of the critical function in an impact input box 806. A list of available parties may be provided in a pull-down menu through the use of pull-down control 808. Examples of entities that may be impacted by a loss of a critical function include clients, customers, vendors, employees, and executives.

Once the user has inserted the critical function information, they select apply button 810, which causes the critical function to be submitted to the business continuity planning tool 102.

Figure 9:
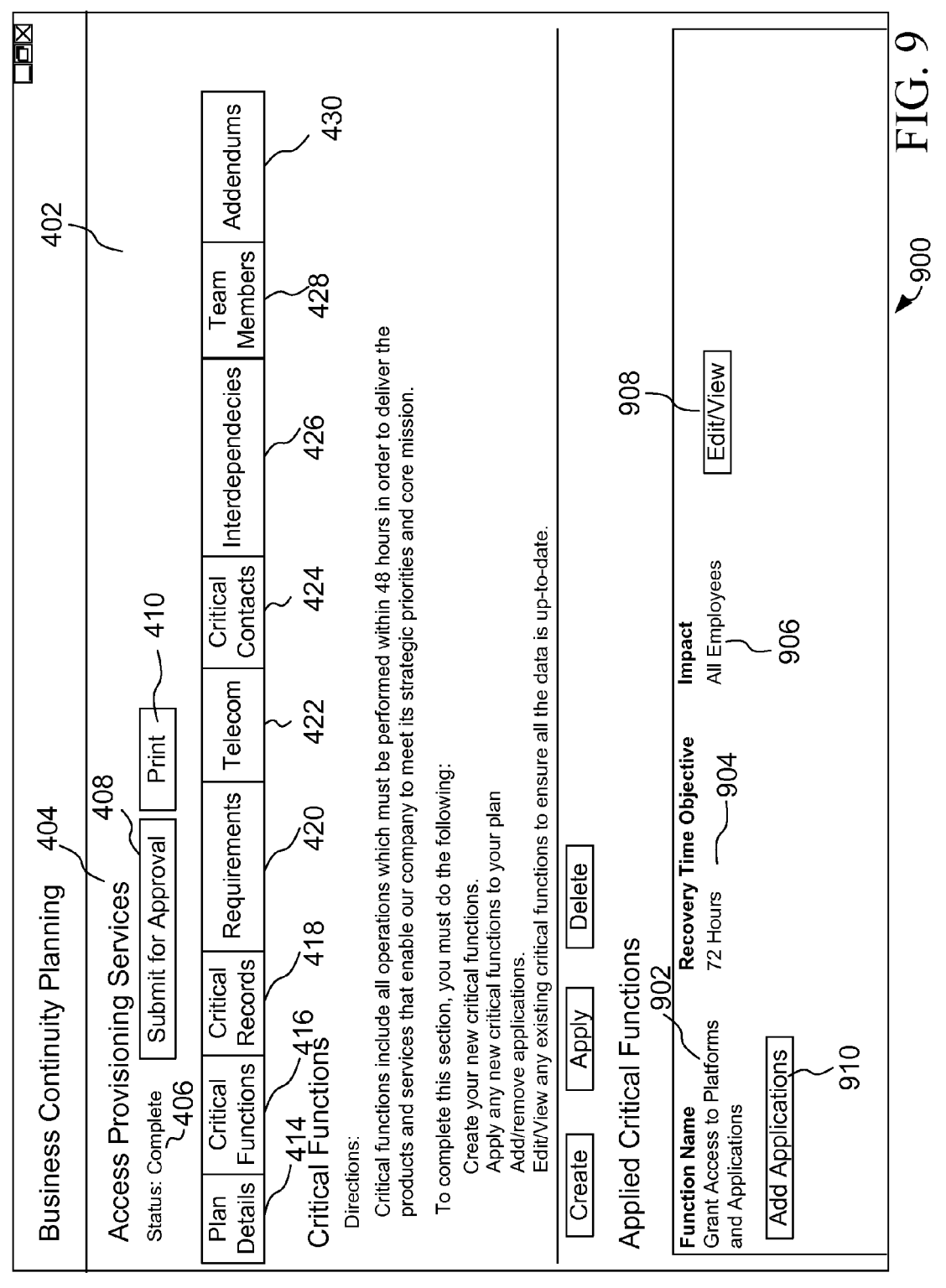

In response, business continuity planning tool 102 returns an updated critical functions page 900 of FIG. 9. In FIG. 9, the inputted critical function is listed as an applied critical function 902 with its recovery time objective 904 and its impacted entities 906. Applied critical function 902 also includes an edit/view button 908, which when selected returns the user to critical functions page 800 of FIG. 8 so that the user may change the information they provided for the critical function.

Critical functions page 900 also includes an add applications button 910 that allows users to request a page in which to add applications that are necessary to perform the critical function. When the user selects the add applications button 910 at step 610 of FIG. 6, server 112 receives the request for the page and retrieves computer program list 106 at step 612. Server 112 then provides the list of computer program names from computer program list 106 through a user interface and requests an indication of which computer program is required to perform the critical function at step 614. FIG. 10 provides an example of a critical functions page 1000, which provides the list of computer program names in an input box 1002. Specifically, the list of computer program names is used to populate a pull-down menu that extends from input box 1002 when pull-down control 1004 is selected by the user. After making a selection from the pull-down menu, the user selects add button 1006 to submit the selected computer program name to server 112.

At step 616, server 112 receives the selected computer program name. At step 618, server 112 associates the critical function with the computer application name by storing a critical function ID in a computer program critical function list 110 for the computer program name. In computer program critical function list 110, each computer program has a separate list that lists all of the critical functions that the computer program has been identified as being critical for performance of the function. This list makes it efficient to identify which critical functions are impacted when a computer program becomes unavailable. This allows executives to limit damage caused by the loss of this computer program.

At step 620, server 112 retrieves the expected recovery time for the selected computer program from computer program list 106, which is stored in memory on server 112. At step 622, server 112 provides the expected recovery time to the user and requests an indication of whether the expected recovery time is acceptable. FIG. 11 provides an example of a critical functions user interface 1100 in which an application name 1102 and an expected recovery time 1104 for the application are displayed along with a request for an indication of whether the recovery time meets the recovery point objective 1106. In accordance with one embodiment, an input box 1108 that includes a pull-down control and when activated provides a list of possible values of yes and receives the user's indication of whether the expected recovery time is acceptable. After making a selection in box 1108, the user can press add button 1110 to submit their indication of whether the expected recovery time is acceptable. At step 624, server 112 receives the user's indication and stores the computer program name, the recovery time, and the indication that the recovery time does or does not meet the recovery point objective in memory as part of the business continuity plan at step 624.

The process of FIG. 6 then returns to step 610 to determine if the user has selected the add-applications button 910 again. With each selection of add-applications button 910, steps 612, 614, 616, 618, 620, 622, and 624 are repeated.

FIG. 12 shows a critical functions page 1200 after three applications have been added to a critical function. In particular, for critical function 1202, applications 1204, 1206, and 1208 have been added. Page 1200 also includes a remove-applications button 1210 that allows the user to remove one or more of the applications. In accordance with some embodiments, selecting remove-applications button 1210 causes a new critical functions page to be displayed in which the user may select which of the applications they wish to remove.

Figure 13:
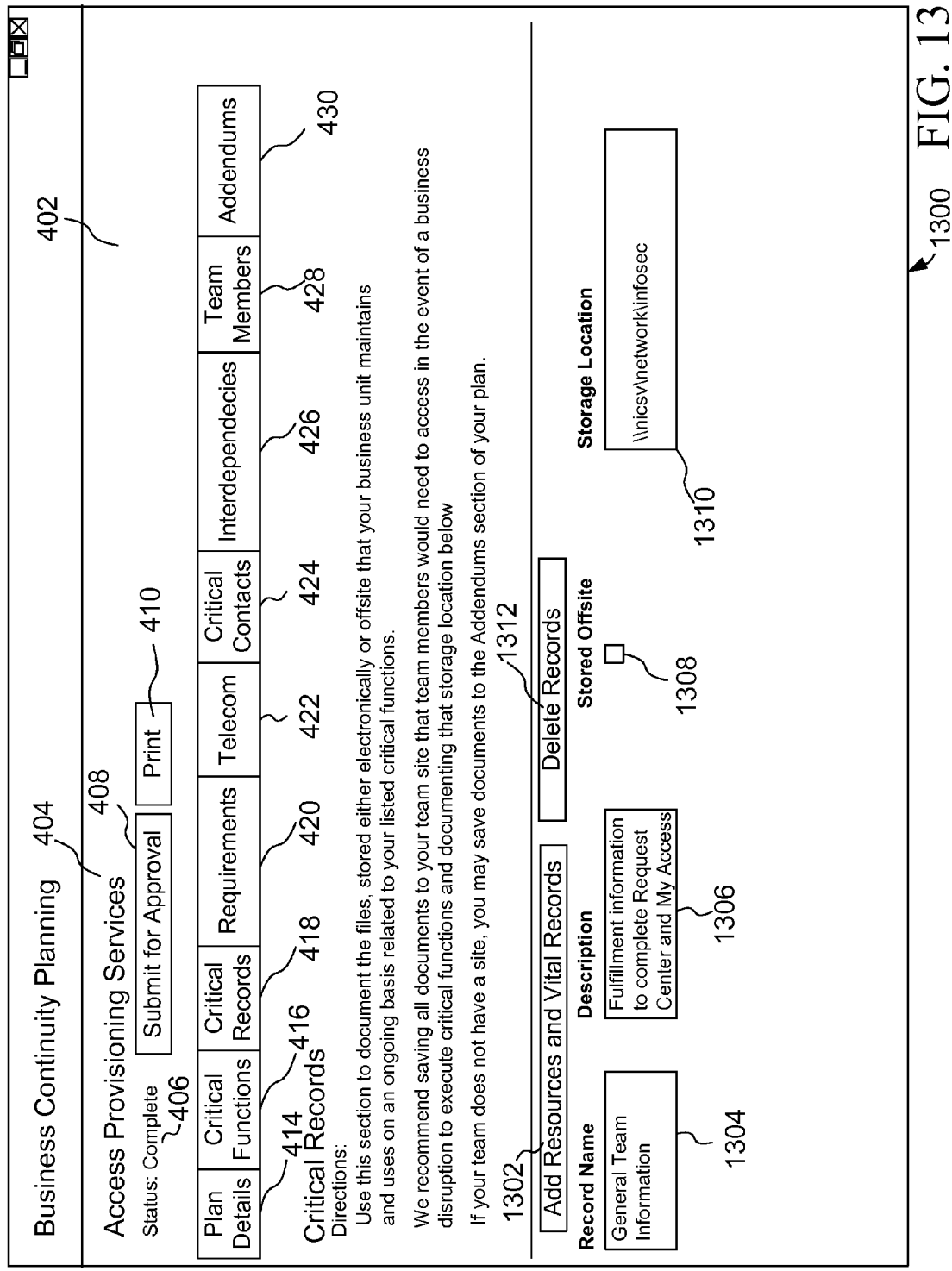
FIG. 13 is an example of a user interface for a critical records page.

FIG. 13 provides an example a critical records page 1300, which is one of the business continuity planning tools pages 104 and is provided in response to a selection of critical records tab 418. Critical records page 1300 allows a user to designate documents or files stored either electronically or offsite that the business user maintains or uses on an ongoing basis related to a list of critical functions. Critical records page 1300 includes an add-resources-and-vital-records button 1302 that allows users to add the resources and records that they use. Each record includes a record name 1304, a record description 1306, a stored offsite indication 1308, and a storage location 1310. Critical records page 1300 also includes delete-records button 1312, which allows a user to delete one or more of the records entered previously.

FIG. 14 provides an example of a minimum requirements inventory page 1400, which is part of continuity planning pages 104 and is returned when a user selects requirements tab 420 from header 402. Minimum requirements inventory page 1400 is used to document current and preferred alternate locations and minimum team member requirements in order for the business unit to perform its critical functions. Page 1400 includes a current location pull-down input box 1402 and a current location manual entry input box 1404. Current location pull-down input box 1402 uses the selection of a pull-down control 1406 to display a predefined list of locations from which the user may select their current location. If the user's location is not in the list of current locations, the user may select radio button 1408 to indicate that they specified their own location in manual entry input box 1404. Page 1400 also includes a preferred alternate location pull-down input box 1410 and a manual entry preferred alternate location input box 1412. Preferred alternate location pull-down input box 1410 includes a pull-down control 1414 that can be used to provide a list of alternate locations. The user may select from that list or if their preferred alternate location is not within that list, may select radio button 1416 to provide their own value in preferred alternate location manual entry input box 1412.

Page 1400 also includes an assigned alternate location room input 1418 that the business unit may use to indicate a room that has already been assigned to them as an alternate location. If a business unit has not been assigned a room, this value will be designated as not applicable (N/A). Requirements page 1400 also includes current team member population 1420 and minimum team members 1422 required to perform the functions of the business unit. Page 1400 also includes a number of alternate location work stations 1424, which is automatically populated at 40% of the current team member population provided in current team member box 1420. Input box 1426 allows the user to enter the number of team members that can work from home and input box 1428 allows the user to input the number of team members with company-owned laptops. Users can save the data input into the fields of page 1400 using save button 1430 or can remove the values in the input fields using cancel button 1432. The user is also able to add multiple locations using add new location button 1434, which provides entry fields 1402, 1404, 1410, 1412, 1418, 1420, 1422, 1424, 1426, and 1428 for the new location. Thus, business units that span more than one location can input a separate alternate location for each of their primary locations.

FIG. 15 provides a telecommunications information page 1500 that is part of continuity planning pages 104 and is displayed when the user selects Telecom tab link 422. Telecommunications information page 1500 is used to add phone or fax numbers that are externally published and that are used to support critical functions. To add a telephone number, a user selects add-new-telecommunications-item button 1502, which causes input boxes 1504, 1506, and 1508 to be displayed. Input box 1504 accepts a critical telephone number, input box 1506 accepts the type of number using a pull-down control 1510. Examples of communication types include phone and fax. Input box 1508 receives a description of the functions performed at the critical phone number and how the critical phone number is needed to support a critical function. A user may also delete a telecommunication item using delete-telecommunications-item button 1512.

FIG. 16 provides an example of a critical contacts page 1600 that is part of continuity planning pages 104 and is provided when a user selects critical contacts tab link 424. Critical contacts page 1600 allows the user to input critical contact information for business units or other vendors that support one of the critical functions performed by the present business unit. To add a critical contact, the user selects add-critical-contacts button 1602. In response to the selection of add-critical-contacts button 1602, input fields 1604, 1606, 1608, and 1610 are displayed. Input field 1604 accepts the name of a business unit or vendor and input field 1606 accepts a phone number for that business unit or vendor. Input field 1608 accepts the name of a contact person within that business unit or vendor and input field 1610 includes one or more notes about the contact and why the contact is important to the critical function of this business unit.

FIG. 17 provides an example of an interdependencies page 1700, which is part of continuity planning pages 104 and is provided when the user selects interdependencies tab 426. Interdependencies page 1700 allows a user to indicate business units that a present business unit depends on or that depends on the present business unit to perform the business unit's critical functions. To add an interdependency, a user selects add-interdependencies button 1702. In response, input fields 1704, 1706, and 1708 are displayed. Input field 1704 accepts the business unit or vendor. Input field 1706 indicates whether the dependency is an inflow, outflow or inflow/outflow dependency. If the present business unit is dependent on another business unit for information, the dependency is an inflow dependency in field 1706. If another business unit or vendor is dependent on the current business unit for information, the interdependency is an outflow dependency. If the flow of information is in both directions between this business unit and the other business unit or vendor, the dependency is an inflow/outflow dependency in field 1706. Input field 1706 includes a pull-down control 1710 that allows a user to select between inflow, outflow, and inflow/outflow. Input field 1708 receives a description of the workflow between the two business units. In order to save the information input into the fields of page 1700, the user can select save button 1712.

FIG. 18 provides a team members page 1800, which is part of continuity planning pages 104 and is provided in response to a selection of team members tab 428. Team members page 1800 is used to document the members of a business unit. Page 1800 includes an upload button 1802 that allows users to upload a document containing a list of the team members such as document 1804. When a user uploads a document containing the team members, the name of the person who uploaded the document is placed in a modified-by field 1806 and the date and time that that the document was uploaded is placed in a modified field 1808.

FIG. 19 provides an example of an addendums page 1900, which is part of continuity planning pages 104 and is returned in response to a selection of addendums tab 430. Addendums page 1900 allows users to upload critical documents using an upload button 1902. When a document is uploaded, a new entry is created that includes the document's name 1904, the person who uploaded the document 1906, the date and time the document was uploaded 1908, and a delete button 1910 that can be used to delete the entry. Such documents may include a manual describing how to proceed when critical functions are lost.

Figure 20:
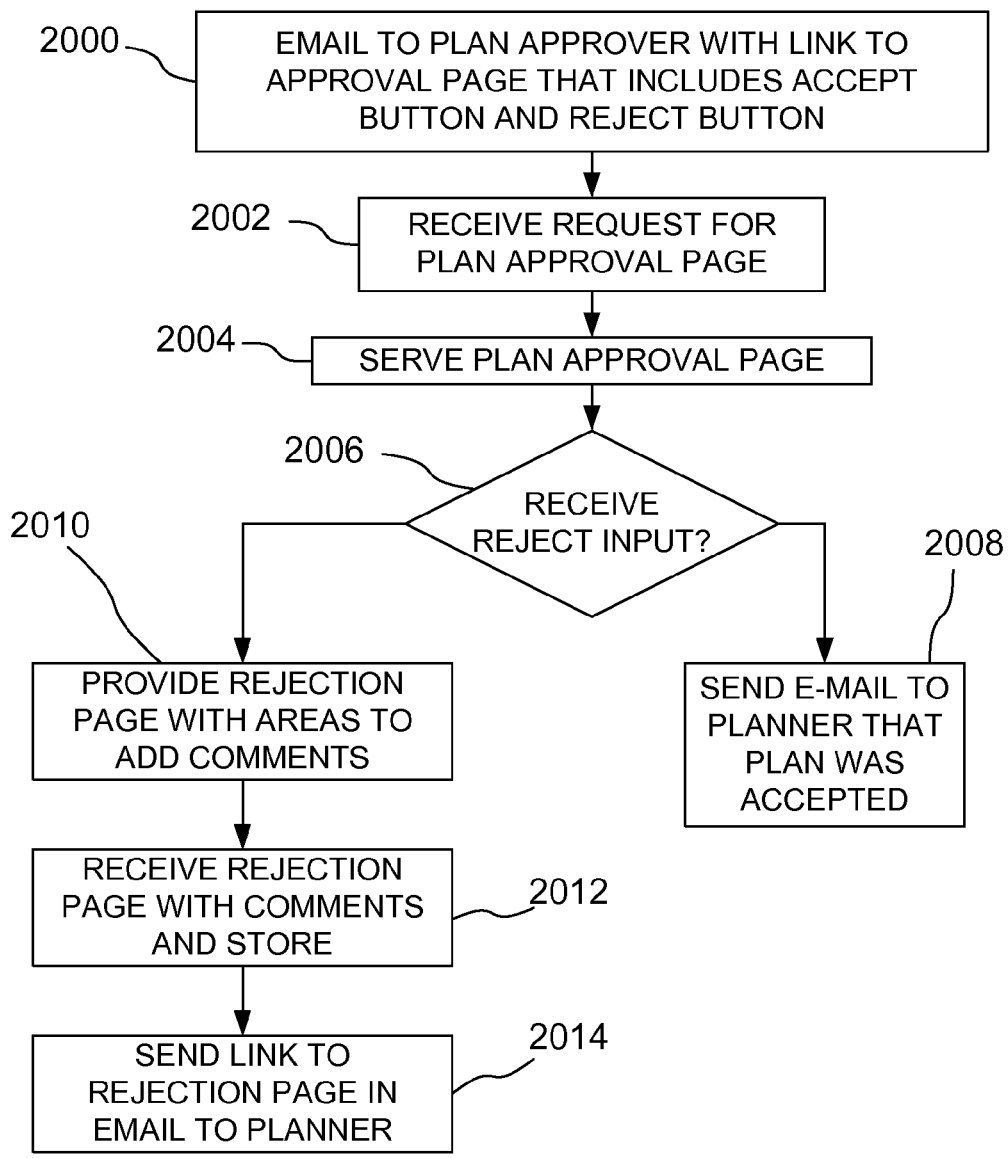
FIG. 20 is a flow diagram of a method of approving a business continuity plan.

FIG. 20 provides a flow diagram of a method that is performed when a user submits their business continuity plan for approval using submit-for-approval button 408. At step 2000, an email is sent to the plan approver with a link to an approval page that includes the business continuity plan, an accept button and a reject button. At step 2002, server 112 receives a request for the plan approval page based on a user selecting a link in the email sent in step 2000. At step 2004, server 112 serves the plan approval page. At step 2006, server 112 either receives a rejection input or an acceptance input based on a selection made by the user viewing the plan approval page. If an acceptance is received at step 2006, an email is sent to the planner using email server 122 to indicate that the plan was accepted at step 2008. If a rejection input is received at step 2006, server 112 provides a rejection page with areas to add comments about the rejection at step 2010. The rejection page allows the user to indicate why the business continuity plan has been rejected. For example, if the business continuity plan indicates that an expected recovery time is not acceptable, the plan approver will reject the business continuity plan and will indicate in the comments that the plan is not approved because the expected recovery time is unacceptable. At step 2012, server 112 receives the rejection page with the comments and stores the contents of the rejection page. At step 2014, server 112 sends a link to the rejection page in an email to the planner listed in the business continuity plan.

FIG. 21 provides an example of a metrics page 2100 that is returned when a user selects metrics button 214 of FIG. 2. Metrics page 2100 includes company-wide metrics associated with business continuity planning. In particular, table 2102 provides a total number of business continuity plans that are required in a total member field 2104 and a percentage of plans that have been approved in a plan approved field 2106. Table 2102 also indicates the number of successful simulations that have been performed in a simulation field 2108 and the number of meetings that have been held to discuss business continuity planning in a table top field 2110. Notification field 2112 indicates the percent of business plans in which a notification was successfully sent using the contact information provided in a business continuity plan. Annual training field 2114 indicates the percentage of business units that have successfully completed annual training for business continuity planning.

Table 2116 provides the same columns as table 2102 except broken down for each of a set of business unit pyramids. Thus, each pyramid includes a total number of plans 2118, percentage of plans approved 2120, percentage of simulations performed 2122, percentage of business continuity meetings held 2124, percent of successful notifications 2126 and percent of business units within the pyramid that have successfully performed annual training 2128.

Business unit metrics area 2130 allows a user to see if any one particular business unit has had their plan approved 2132, has performed a simulation 2134 has held a business continuity meeting 2136, has successfully tested its notification 2138 and has performed annual training 2140. In particular, by selecting the "+" near the pyramid name in area 1230, the business units for that pyramid can be displayed with the metrics of each business unit within the pyramid being displayed.

An example of a computing device that can be used as a server and/or client device in the various embodiments described above is shown in the block diagram of FIG. 22. The computing device 10 of FIG. 22 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the personal computer 10, is stored in ROM 18.

Embodiments above can be applied in the context of computer systems other than personal computer 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computer 10 further includes a hard disc drive 24, nonvolatile solid-state memory 25 an external memory device 28, and an optical disc drive 30. External memory device 28 can include an external disc drive or solid state memory that may be attached to computer 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid-state memory and external memory devices and their associated computer-readable media provide nonvolatile storage media for the personal computer 10 on which computer-executable instructions and computer-readable data structures may be stored. Such computer-executable instructions can include instructions for performing any of the steps described in the methods above. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include continuity planning tool 102 and code associated with continuity planning pages 104. Program data 44 may include data stored in computer program list 106, business plan list 108 and computer program critical function list 110 as well as data stored in continuity planning pages 104.

Input devices including a keyboard 63 and a mouse 65 are connected to system bus 16 through an Input/output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The personal computer 10 may operate in a network environment utilizing connections to one or more remote computers, such as a remote computer 52. The remote computer 52 may be a server, a router, a peer device, or other common network node. Remote computer 52 may include many or all of the features and elements described in relation to personal computer 10, although only a memory storage device 54 has been illustrated in FIG. 22. The network connections depicted in FIG. 22 include a local area network (LAN) 56 and a wide area network (WAN) 58. Such network environments are commonplace in the art.

The personal computer 10 is connected to the LAN 56 through a network interface 60. The personal computer 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the personal computer 10, or portions thereof, may be stored in the remote memory storage device 54. For example, application programs may be stored utilizing memory storage device 54. In addition, data associated with an application program, such as data stored in the databases or tables described above, may illustratively be stored within memory storage device 54. It will be appreciated that the network connections shown in FIG. 22 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
    receiving a request for a page to add a computer program name for a critical function that a business unit performs and that must be performed within a set period of time;
    retrieving a list of computer program names from memory;
    providing the list of computer program names through a user interface;
    receiving a selection of a first computer program name as being a name of a first computer program required to perform the critical function;
    assigning a critical function identifier to the critical function;
    storing the critical function identifier in a list for the computer program, wherein the list for the computer program comprises a list of critical functions to which the computer program has been associated;
    retrieving a first expected recovery time from memory for the first computer program, the first expected recovery time being the expected time needed to make the first computer program available to a network; and
    providing the first expected recovery time through a user interface and requesting an indication of whether the first expected recovery time is acceptable.

2. The computer-implemented method of claim 1 further comprising:
    receiving a second request for a page to add a computer program name for a critical function that a business unit performs;
    retrieving the list of computer program names from memory;
    providing the list of computer program names through the user interface;
    receiving a selection of the second computer program name as being a name of a second computer program required to perform the critical function;
    retrieving a second expected recovery time from memory for the second computer program, the second expected recovery time being the expected time needed to make the second computer program available to a network;
    providing the second expected recovery time through a user interface and requesting an indication of whether the second expected recovery time is acceptable.

3. The computer-implemented method of claim 2 wherein the first expected recovery time and the second expected recovery time are set before critical functions are identified.

4. The computer-implemented method of claim 3 wherein responsibility for recovery of the first computer program and the second computer program is assigned to someone outside of the business unit.

5. The computer-implemented method of claim 1 further comprising receiving an indication that the first expected recovery time is acceptable and storing the indication that the first expected recovery time is acceptable as part of a business continuity plan.

6. A computer-implemented method comprising:
    receiving a request for a page to add a computer program name for a critical function that a business unit performs;
    retrieving a list of computer program names from memory;
    providing the list of computer program names through a user interface;
    receiving a selection of a first computer program name as being a name of a first computer program required to perform the critical function;
    retrieving a first expected recovery time from memory for the first computer program, the first expected recovery time being the expected time needed to make the first computer program available to a network;
    providing the first expected recovery time through a user interface and requesting an indication of whether the first expected recovery time is acceptable; and
    receiving an indication that the first expected recovery time is not acceptable and storing the indication that the first expected recovery time is not acceptable as part of a business continuity plan.

7. The computer-implemented method of claim 6 further comprising:
    displaying the business continuity plan including the indication that the first expected recovery time is not acceptable to a plan approver; and receiving an indication from the plan approver that the business continuity plan is rejected because the first expected recovery time is not acceptable.

8. A non-transitory computer-readable medium having computer-executable instructions stored thereon that cause a processor to perform steps comprising:
  providing a list of computer application names for computer applications available on a network;
  receiving a selection of one of the computer application names;
  retrieving a recovery time for the selected computer application name, the recovery time representing an amount of time needed to make a computer application with the computer application name available to an end user after an event causes the computer application to be inaccessible;
  displaying the retrieved recovery time to a user through a user interface; and
  identifying what parties are impacted by the inaccessibility of the computer program, the parties including at least one of clients, customers, vendors, and employees.

9. The computer-readable medium of claim 8 further comprising:
  displaying a request through the user interface for the user to indicate if the retrieved recovery time is acceptable.

10. The computer-readable medium of claim 9 further comprising:
  receiving an indication that the retrieved recovery time is not acceptable; and
  storing the indication that the retrieved recovery time is not acceptable as part of a business continuity plan.

11. The computer-readable medium of claim 8 further comprising:
  before providing a list of computer application names for computer applications available on a network, receiving an indication of a critical function that must be performed within a set period of time; and
  associating the selected computer application name with the critical function.

12. The computer-readable medium of claim 11 wherein associating the selected computer application name with the critical function comprises:
  assigning a critical function identifier to the critical function; and
  storing the critical function identifier in a list for the computer application wherein the list for the computer application comprises a list of critical functions to which the computer application has been associated.

13. The computer-readable medium of claim 11 wherein the recovery time is stored for the computer application before receiving the indication of the critical function that must be performed.

14. The computer-readable medium of claim 11 further comprising:
  providing a second list of computer application names for computer applications available on a network;
  receiving a second selection of one of the computer application names;
  retrieving a second recovery time for the second selected computer application name, the second recovery time representing an amount of time needed to make a second computer application with the second selected computer application name available to an end user after an event caused the second computer application to be inaccessible; and
  displaying the retrieved second recovery time to a user through a user interface.

15. The computer-readable medium of claim 14 further comprising associating the second selected computer application name with the critical function.

\* \* \* \* \*